United States Patent
Seppinen et al.

(10) Patent No.: US 6,646,449 B2
(45) Date of Patent: Nov. 11, 2003

(54) INTERMODULATION DETECTOR FOR A RADIO RECEIVER

(75) Inventors: Pauli Seppinen, Espoo (FI); Aarno Pärssinen, Espoo (FI); Mikael Gustafsson, Porvoo (FI)

(73) Assignee: Nokia Corporation, Espoo (FI)

( * ) Notice: Subject to any disclaimer, the term of this patent is extended or adjusted under 35 U.S.C. 154(b) by 11 days.

(21) Appl. No.: 10/034,643

(22) Filed: Dec. 28, 2001

(65) Prior Publication Data

US 2003/0122534 A1 Jul. 3, 2003

(51) Int. Cl.$^7$ ............ G01R 23/20; G01R 23/16; H04B 17/00; H04B 1/10
(52) U.S. Cl. ............ 324/624; 324/76.12; 455/67.3; 455/226.1; 702/69; 702/191
(58) Field of Search ............ 324/76.51, 614, 324/624, 620, 626, 76.12; 455/67.1, 67.3, 296, 226.1, 226.3, 63; 375/346; 702/191, 108, 69, 189; 327/317

(56) References Cited

U.S. PATENT DOCUMENTS

| | | | | |
|---|---|---|---|---|
| 3,153,192 A | * | 10/1964 | Pidhayny et al. | 324/77.11 |
| 3,806,809 A | * | 4/1974 | Firman | 455/115 |
| 5,909,645 A | | 6/1999 | Abramsky et al. | 455/249.1 |
| 5,978,362 A | * | 11/1999 | Lee et al. | 370/315 |
| 6,009,129 A | * | 12/1999 | Kenney et al. | 375/346 |
| 6,052,566 A | | 4/2000 | Abramsky et al. | 455/67.1 |
| 6,140,858 A | * | 10/2000 | Dumont | 327/317 |

* cited by examiner

Primary Examiner—Anjan K. Deb
(74) Attorney, Agent, or Firm—Ware, Fressola, Van Der Sluys & Adolphson LLP (57) ABSTRACT

An intermodulation detector (11) that operates standalone or in parallel with a radio receiver (10) of a radio receiver system (100) including a receiver tuning logic module (12), and, in the case of operating standalone, provides signals conveying information about intermodulation power in the receiver frequency band, and in case of operating in parallel with a radio receiver (10), provides to the receiver tuning logic module signals conveying information about power aliasing into the frequency band to which the radio receiver is tuned.

15 Claims, 5 Drawing Sheets

INTERMODULATION DETECTOR FOR A RADIO RECEIVER

FIELD OF THE INVENTION

The present invention relates to the field of radio receivers in general, including radio receivers used in wireless telecommunications/mobile phones, and more particularly to controlling the linearity of a radio receiver.

BACKGROUND OF THE INVENTION

Power consumption is an essential performance parameter of a radio receiver and in particular of all portable (battery-powered) radio receivers. There are several common radio systems that have strict limitations on power consumption, such as the limitations imposed for cellular communications (GSM, IS-95, AMPS, etc.), for cordless phones (DECT), and for wireless connectivity systems (WLAN, Bluetooth). All such systems benefit from being able to operate at low power, since operating at lower power provides a larger margin for meeting any imposed limitation on power consumption. In particular, so-called third generation mobile phones, expected to become available in the near future, will consume significantly more power than current generation mobile phones because of the many additional services the third-generation mobiles will provide. Power is consumed by the transceiver of a mobile phone in both transmitting and receiving wireless signals. In receiving a radio signal at a particular frequency, the radio receiver portion of a transceiver can be made to act more or less linearly in that it can be made to tolerate more or less of all signals not transmitted at the desired frequency. The more linearly a radio receiver is made to operate, the more power it consumes (because to operate more linearly, more power must be provided to active components of a receiver to tolerate unwanted signal).

One particular problem that is managed by controlling the linearity of a receiver is intermodulation distortion, referring to the so-called third-order intermodulation distortion power ($P_{IMD3}$) aliasing onto the frequency (channel) to which the receiver is tuned. In an environment with significant intermodulation distortion, a receiver must be made to act more linearly so as to avoid receiving unwanted signals. However, when signal conditions change so that intermodulation distortion is insignificant, then a receiver can be allowed to operate less linearly, and so use less power. Thus, what is needed for use with a receiver is a detector of potential intermodulation distortion (intermodulation distortion that is to be avoided by adjusting the linearity requirement for the receiver), a detector that provides one or more indicators of the potential intermodulation distortion and so provides information useful to the receiver in establishing a linearity requirement for operation of the receiver.

Although a detector of potential intermodulation distortion is particularly useful in reducing power consumption, such a device can be used to measure intermodulation performance distortion for other purposes as well, such as characterizing a radio network with respect to intermodulation distortion which is useful in the design of the radio network. In such an application, an intermodulation detector can be operated as a standalone measurement device, not connected to a receiver operating in a radio system. (In such an application, the measurement set up need not necessarily be power limited.) Other applications for an intermodulation detector are also possible.

Thus, what is needed more generally is a detector of potential intermodulation distortion, whether or not the detector is provided as part of a receiver system (including a radio receiver for use with some radio network). Such a detector should be able to be implemented using either analog or digital signal processing techniques, depending on the particular application and available implementation technologies.

SUMMARY OF THE INVENTION

Accordingly, in a first aspect of the invention a method is provided including: a step, responsive to a received signal over a predetermined wide bandwidth and responsive to a tuner signal at a predetermined tuner frequency, of providing a selected signal at a selected signal frequency; and a step of processing the selected signal so as to provide a detector signal indicating intermodulation distortion power at the selected signal frequency.

In accord with the first aspect of the invention, the method may also include a step of adjusting a linearity requirement for a receiver module based on the signal indicating the intermodulation distortion power, and the step of processing the mixed signal may be performed using a detector circuit that is substantially more responsive to intermodulation interference than the receiver module.

Also in accord with the first aspect of the invention, the step of measuring intermodulation distortion power may include: a step of squaring the selected signal; an optional step of providing the squared signal in a suitable digital form; a step of multiplying the squared signal by the baseband signal to provide a cubed signal; and a step of providing the cubed signal in a suitable digital form.

In a second aspect of the invention, an apparatus is provided, including: means, responsive to a received signal over a predetermined wide bandwidth and responsive to a tuner signal at a predetermined tuner frequency, for providing a selected signal at a selected signal frequency; and means for processing the selected signal so as to provide a detector signal indicating intermodulation distortion power at the selected signal frequency.

In accord with the second aspect of the invention, the apparatus may also include means for adjusting a linearity requirement for a receiver module based on the signal indicating the intermodulation distortion power (PIMD3), and the means for processing the mixed signal may be performed using a detector circuit that is substantially more responsive to intermodulation interference than the receiver module.

Also in accord with the second aspect of the invention, the means for processing the selected signal may include: means for squaring a signal derived from the selected signal, and so providing a squared signal; means for multiplying the squared signal with the selected signal, and so providing a cubed signal; and means for processing the cubed signal so as to provide the detector signal indicating intermodulation distortion power.

Also in accord with the second aspect of the invention, the means for providing a selected signal at a selected signal frequency may include means for providing a baseband signal, and further, all operations including those performed by the means for providing a baseband signal may be performed after analog-to-digital conversion.

Still also in accord with the second aspect of the invention, the apparatus may also include an analog-to-digital conversion means for performing an analog-to-digital conversion that is disposed at some node of the apparatus so that at least some of the signal processing performed by the apparatus is digital signal processing performed after the analog-to-digital conversion means.

In a third aspect of the invention, a radio transceiver is provided including a radio receiver that includes an apparatus according to the second aspect of the invention.

The invention is of use in both a standalone mode, where it can be used to characterize a radio environment over some bandwidth, independent of any particular receiver, which might be done for example in order to optimize the performance of a radio network, but could also be done independent of any particular radio network. Although the prior art teaches various equipment for performing such measurements, it is desirable to study the radio environment of a radio network using different measurement techniques. The invention provides measurements using a simple and inexpensive device and makes it possible to collect a larger amount of data for use in adjusting the operation of a radio network.

It is also useful as a part of a system providing information about the radio environment in which the system operates; for example, it can provide radio environment measurement information (and in particular the third-order intermodulation distortion power $P_{IMD3}$) useful to a radio receiver system, including a radio receiver module, in adjusting the linearity of the radio receiver module.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
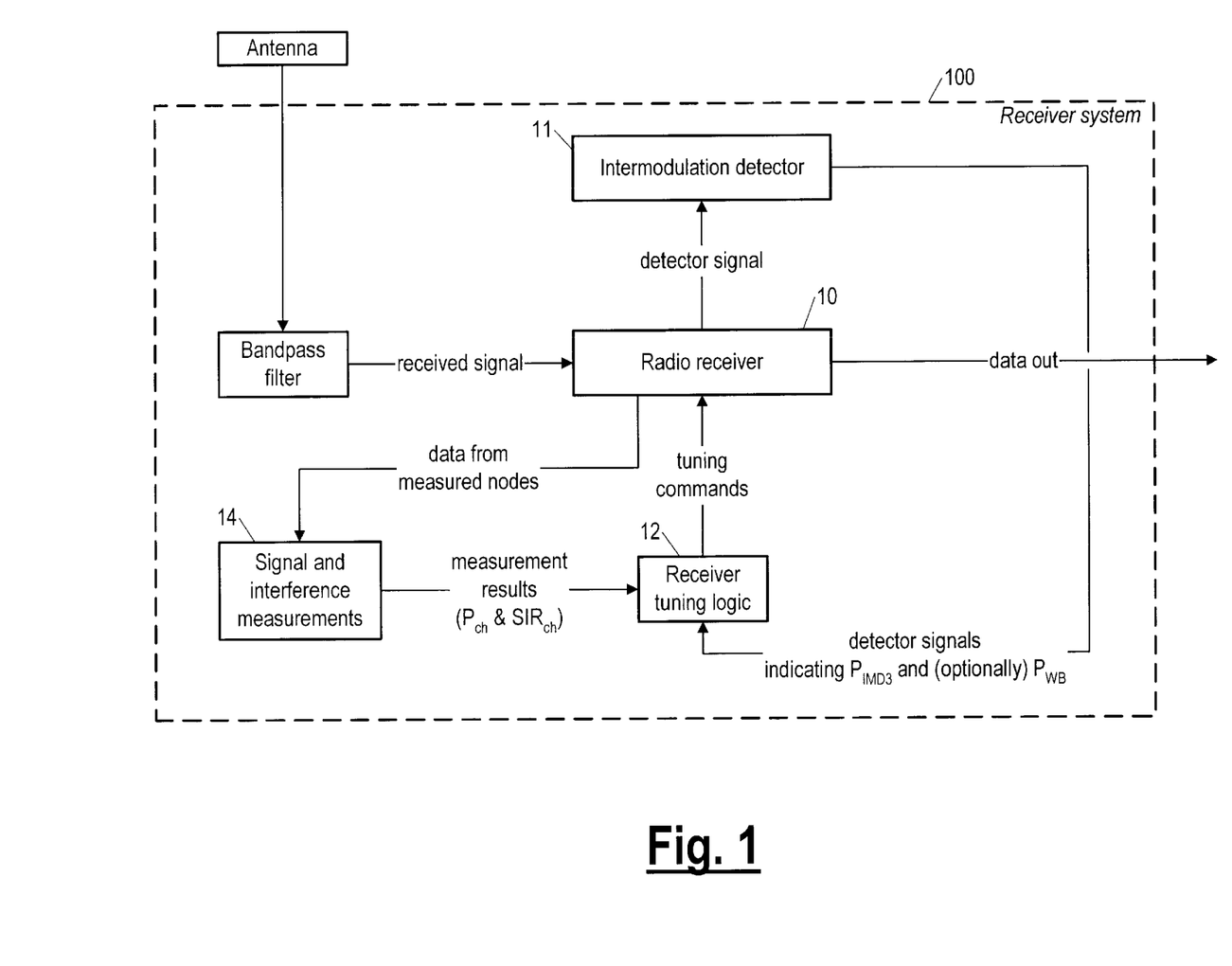
FIG. 1 is a block diagram of parts of a transceiver according to the invention, including a receiver, a tuning logic module, and an intermodulation detector.

Referring now to FIG. 1, a receiver system 100 according to the invention is shown as including a radio receiver (module) 10 for receiving a signal via an antenna after the signal is bandpass filtered, the radio receiver 10 also receiving tuning commands from a receiver tuning logic module 12. The tuning commands are determined based on measurement results provided by a signal and interference measurements module 14 (which is a digital signal processing module) based on data collected by the radio receiver 10 from various nodes (points) in the radio receiver system 100 and provided to the signal and interference measurements module 14, and by an intermodulation detector 11 according to the invention. The signal and interference measurements module 14 provides the power $P_{ch}$ in the channel to which the radio receiver is being tuned and/or the signal-to-interference ratio $SIR_{ch}$ measurements for that channel and possibly some other parameters that can be defined in the radio receiver with conventional methods. The intermodulation detector provides the (measured) total power $P_{WB}$, and the (measured) intermodulation distortion $P_{IMD3}$, also called the third-order intermodulation distortion power.

Figure 2A:
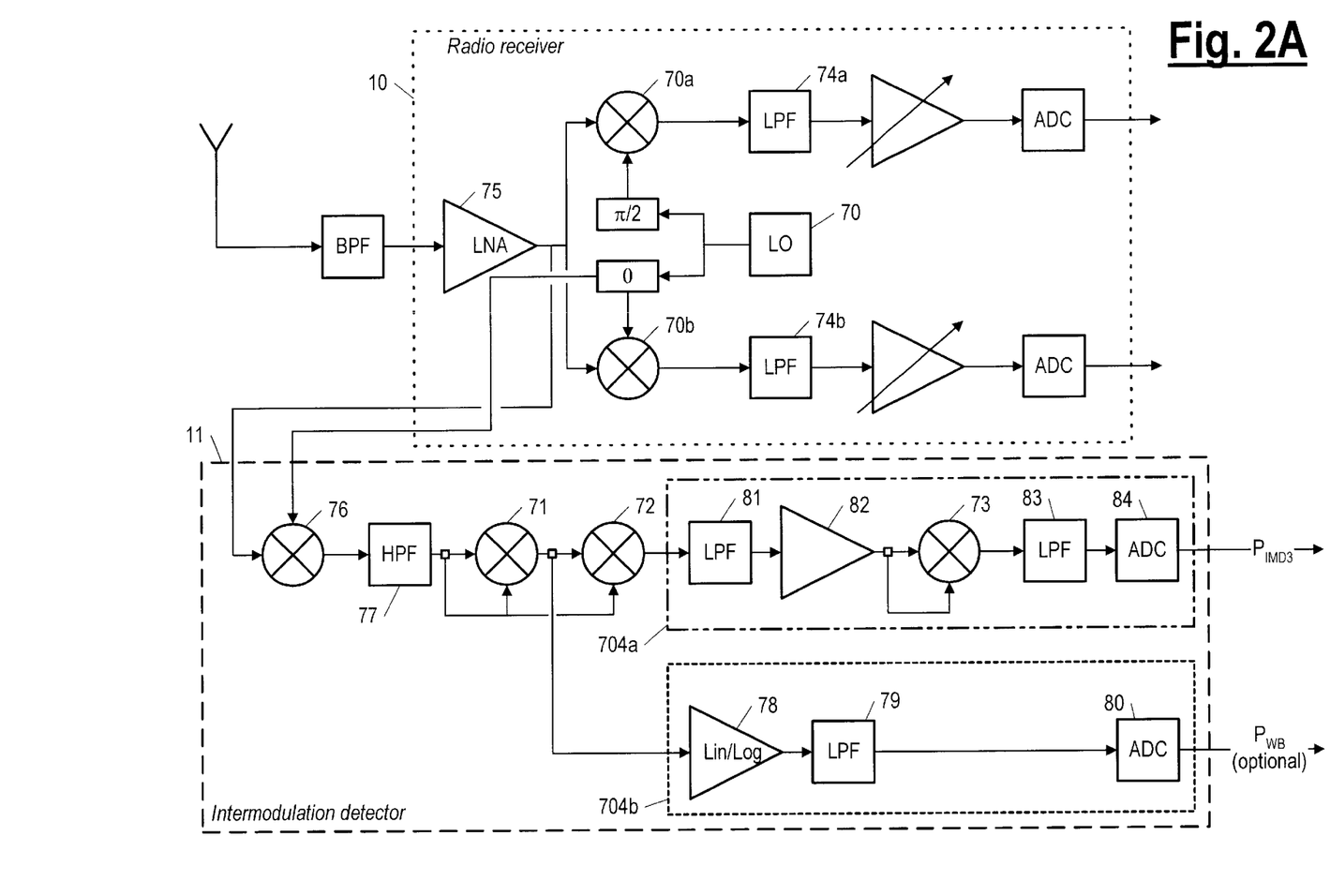
FIG. 2A is a more detailed block diagram of one embodiment of the receiver and one embodiment of the intermodulation detector, both shown in FIG. 1, the intermodulation detector for providing signals to the tuning logic module (also shown in FIG. 1) for tuning the receiver.

Referring still to FIG. 1 and also now to FIG. 2A, the intermodulation detector 11 is shown operating in parallel with the radio receiver (module) 10 and providing to the receiver tuning logic module 12 signals useful in tuning the radio receiver. The intermodulation detector 11 is essentially a receiver made to be especially sensitive to intermodulation distortion. Referring now in particular to FIG. 2A, using as an input a detector signal derived by the receiver 10 from the received signal, the intermodulation detector 11 provides two signals: a first signal $P_{WB}$ indicating the total power at the input of the receiver detected before or after the first amplifier; and a second signal $P_{IMD3}$ indicating essentially the cubed value of the signals falling onto the channel to which the receiver is being tuned (the phenomenon occurring because of the detection of the input signals causing non-linear components in the receiver perceived by the intermodulation detector, and not necessarily occurring to the same extent in the receiver 10). Another unwanted effect in the receiver under large interfering signals is compression. A large signal in the receiver can compress the gain of the signal path through blocking or increasing the noise in the signal path due to changing the operation conditions of analog circuits. The measurement of wideband power by squaring as indicated in FIG. 2A should not be considered alone as a new invention. That technique is well known in radio reception. However, the wideband signal taken (tapped) from the node between mixers 71 and 72 is a very useful parameter for the optimization of the radio receiver and therefore has separate output from the intermodulation detector. Squaring, i.e. power detection, is also an essential part of the intermodulation detector as shown in FIG. 2A. The aliasing onto the channel to which the receiver is being tuned occurs because of the detection of the potential sources causing non-linear components in the intermodulation detector, and not necessarily occurring to the same extent in the receiver 10. Intermodula-tion detector 11 is essentially a monitoring circuit for a radio receiver that can collect nonlinear components, which will alias onto the channel to which the radio receiver is tuned, with linear operations in a controllable manner from a wide band of frequencies. The monitoring circuit is designed to be more sensitive to intermodulation than the actual received signal path and hence it can indicate intermodulation sources before they significantly disturb the radio reception. If two strong signals outside of the channel to which the radio receiver is being tuned pass through non-linear circuits in a radio receiver and the difference in the frequencies of the two tones is certain, then the two channels are said to produce an intermodulation signal that aliases onto the channel to which the radio receiver is being tuned. The two signals provided by the intermodulation detector, the (measured) intermodulation distortion $P_{IMD3}$ and the (measured) total power $P_{WB}$, are used by the receiver tuning logic module 12 (FIG. 1) to adjust the linearity of the radio receiver 10.

FIG. 2A shows one implementation of an intermodulation detector 11 according to the invention. Besides the signal at the band of interest, there are several other radio channels at different carrier frequencies to which the antenna responds, i.e. the intermodulation detector 11 has a wider input bandwidth than the received channel. Those channels can cause the unwanted intermodulation products aliased to the band of interest if the signals are strong enough. Note that the intermodulation detector is not connected directly to the input of the radio receiver 10; instead, in the best mode, it measures the signal at the node (i.e. taps the signal at the node) between LNA 75 and mixers 70a 70b (although the measurements with the same intermodulation detector can also be performed by tapping the input of the LNA 75). The intermodulation detector 11 can be used in other radio receiver architectures besides the direct conversion architecture indicated for the radio receiver 10 of FIG. 2A, and so there are also other nodes in a radio receiver where measurements can be made by an intermodulation detector according to the invention. Also, if there is a need to detect the total power or intermodulation power from a narrower band than will be downconverted with mixer 76, the measurement bandwidth can be limited either at the output of mixer 76 or at the input of mixer 71 with conventional techniques. Such a technique can be for example an additional capacitor connected between the signal ground and the particular node in FIG. 2A. In addition, the capacitor can be tuned or switched during operation according to prior art design techniques, making it possible to observe whether the source of distortion (either total power or intermodulation) is close to the carrier to which the receiver is being tuned. Such information can be utilized in the receiver tuning logic (block 12 in FIG. 1), if needed.

In the implementation shown in FIG. 2A, the intermodulation detector 11 takes as input the wideband signal received by the radio receiver 10 after it is amplified by a low noise amplifier (LNA), and a mixer 76 mixes the wideband signal with a sinusoid provided by a local oscillator (LO). The local oscillator provides a signal at the frequency to which the radio receiver is tuned, and so the mixing of the local oscillator signal and the received signal produces a signal that, when highpass filtered using highpass filter (HPF) 77 as shown in FIG. 2A, no longer includes the frequency to which the radio receiver is tuned. The signal after highpass filtering is then provided to a mixer 71 where it is mixed with itself, so that it is squared, and therefore provides a measure of the power of the received signal excluding the power at the frequency to which the radio receiver is tuned. In an optional branch of an intermodulation detector according to the invention, the output from the mixer 71 is then provided to a subsystem 704b for providing a digital signal indicating $P_{WB}$. In the $P_{WB}$ subsystem 704b, the output from the mixer 71 is provided to an amplifier 78 that can be either a linear amplifier or a logarithmic amplifier (indicated as a Lin/Log amplifier 78 in FIG. 2A); it is then lowpass filtered using a lowpass filter (LPF) 79 and converted to digital form by an ADC 80 (analog-to-digital converter), thus providing a signal $P_{WB}$ indicating the power of the received signal excluding the power at the frequency to which the radio receiver is tuned. (It should be understood that converting the signal being processed to digital form for subsequent digital signal processing can be accomplished at any point in the chain of processing operations leading to the signals PWB and PIMD3; of course all modules following such a conversion would then be provided so as to process digital signals instead of analog signals such as the signals processed by the LPF modules 87 and 79 of FIG. 2A.) The wide-band power detection based on squaring the input signal as given here is a commonly known technique for receivers, but is a new and useful optional enhancement for an intermodulation detector.

Still referring to FIG. 2A, in the main part of the intermodulation detector 11, the output of mixer 71 is also provided as an input to a further mixer 72, where it is mixed with the original output of the highpass filter 77, and so produces as an output essentially the cube of the signal provided by the highpass filter. The cubed output is then processed by a subsystem 704a for providing a digital signal indicating the intermodulation power at the frequency to which the receiver module 10 is tuned. In the subsystem 704a, the cubed output is low-pass filtered by a LPF 81, then amplified by an amplifier 82, indicated (detected) by squaring it using a mixer 73, and lowpass filtered again, using another LPF 83; the result is then finally converted to a digital signal using ADC 84, yielding a digital signal $P_{IMD3}$ indicating the intermodulation power at the frequency to which the radio receiver module 10 is being tuned.

Still referring to FIG. 2A, the detector circuit branch including mixer 73 and the lowpass filter 83 and ADC 84 following the mixer 73 is just one example of an implementation for providing a signal indicating $P_{IMD3}$. The function of this circuit branch can of course be accomplished using other implementations, such as for example one in which the mixer 73 is replaced with a digital mixer placed after the ADC.

As mentioned above, it should be understood that an intermodulation detector according to the invention can make measurements at various nodes of a receiver circuit, not only a node of the type indicated in FIG. 2A (a node at a location in the receiver path before the signal is RF downconverted).

Figure 2B:
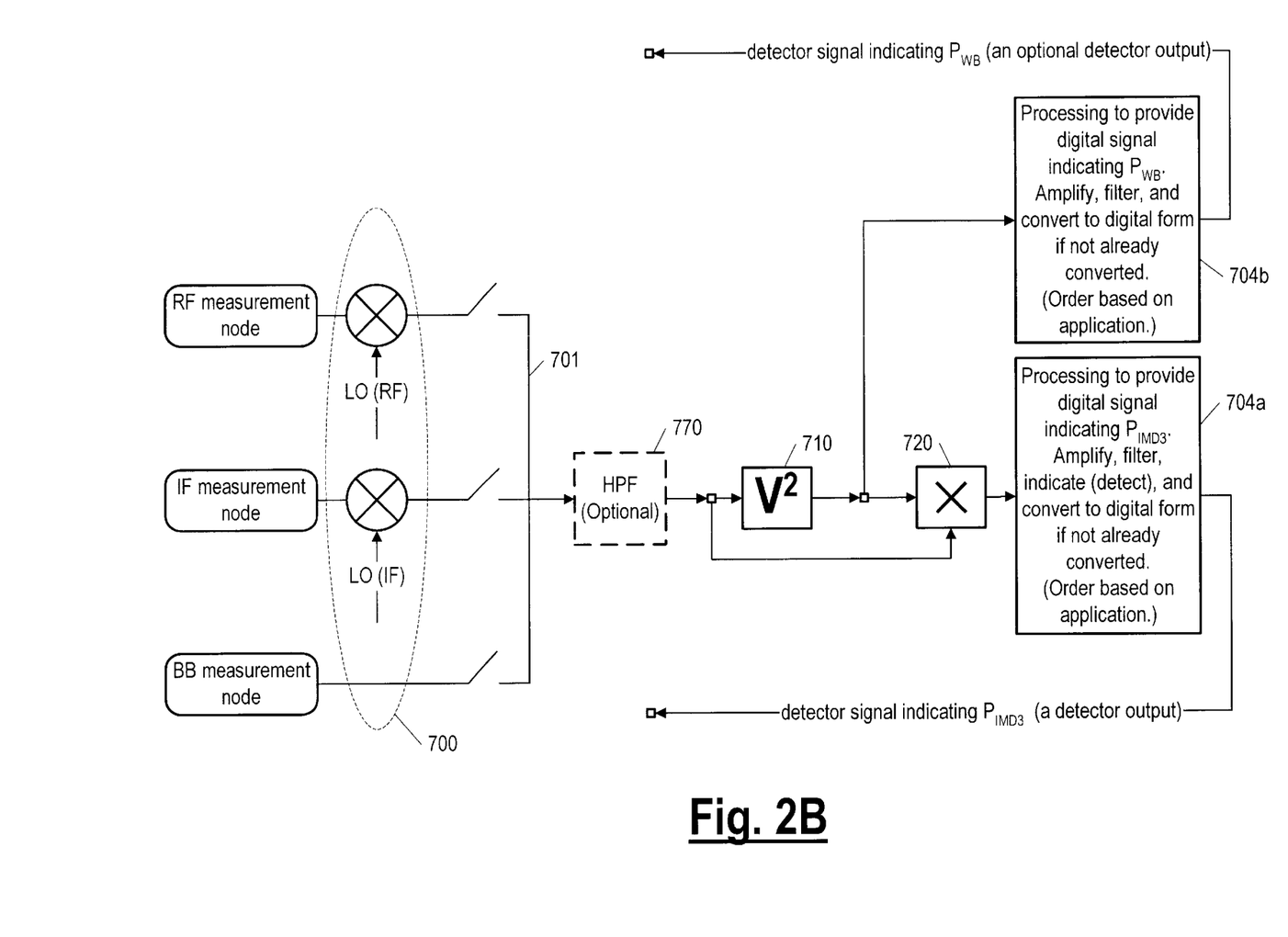
FIG. 2B is a block diagram of an analog intermodulation detector according to the invention.

Thus, for example, now referring to FIG. 2B, an intermodulation detector according to the invention is shown more generally as a circuit in which a baseband signal is provided from a received signal by processing the received signal using one or another of different mixers 700 (via the operation of the switch 701), depending on whether the measured node is located at the RF frequency (the frequency of the carrier wave) or at IF (an intermediate frequency, i.e. for example, the frequency produced in a superheterodyne receiver or in another receiver architecture that does not convert the signal directly to baseband), or, if the measurement node used by the intermodulation detector is at baseband, then using the signal directly, without any mixing. The preferred embodiment, however, is an RF measurement (i.e. using the signal before it is RF downconverted) because then it is possible to measure the potential sources of intermodulation from the widest bandwidth. As indicated in FIG. 2B, after any needed downconverting of the signal is completed, the intermodulation detector squares the signal (using a signal squaring module 710) and then multiplies the square of the signal with the original signal (using a multiplier module 720), giving cubic terms. Next, the output of the multiplier module 720 is amplified, filtered, and indicated (detected) by a first signal processing module 704a (see also FIG. 2A) to provide a signal corresponding to $P_{IMD3}$; the amplification, filtering (to leave only the intermodulation products), signal indication (detection) and converting to digital can be done in an order best suited to the particular application (so that the order is treated as a design choice). (Any filtering and gain functions to be performed before the detector should also be determined as a matter of system design. Similarly, as mentioned above, the conversion of the analog signal to a digital signal using an analog-to-digital converter can be performed at any node in the detector, even at the input in front of the mixer 76 in FIG. 2A. Where the analog-to-digital conversion is performed is also a matter of system design; all necessary functions can be performed either in the analog domain or in the digital domain.) At the same time, the output of the signal squaring module 710 is tapped and some of it is used as an input to a second signal processing module 704b (see also FIG. 2A) to provide a signal corresponding to $P_{WB}$; again, the amplification, filtering (to leave only the intermodulation products), signal indication (detection) and converting to digital can be done in an order best suited to the particular application.

Although a highpass filter in front of the detector to remove the received channel and other low-frequency signals is shown in FIG. 2A, it is optional, and FIG. 2B provides after the switch 701, a highpass filter 770 to filter out the received channel (the channel to which the receiver is tuned), but it is indicated as optional. Such a highpass filter is optional because only the signals larger than the received channel are of interest in measuring interference, and therefore highpass filtering is not mandatory, but is a preferred option. Hence, FIG. 2B describes the invention at a more general level than FIG. 2A.

An essential aspect of the intermodulation detector 11 of the invention is that it can detect input signals causing non-linearity in the receiver to a substantially greater extent than the radio receiver 10. This is so in order that the detected intermodulation products occur within the intermodulation detector 11 with substantially higher power than in the radio receiver 10.

Figure 3A:
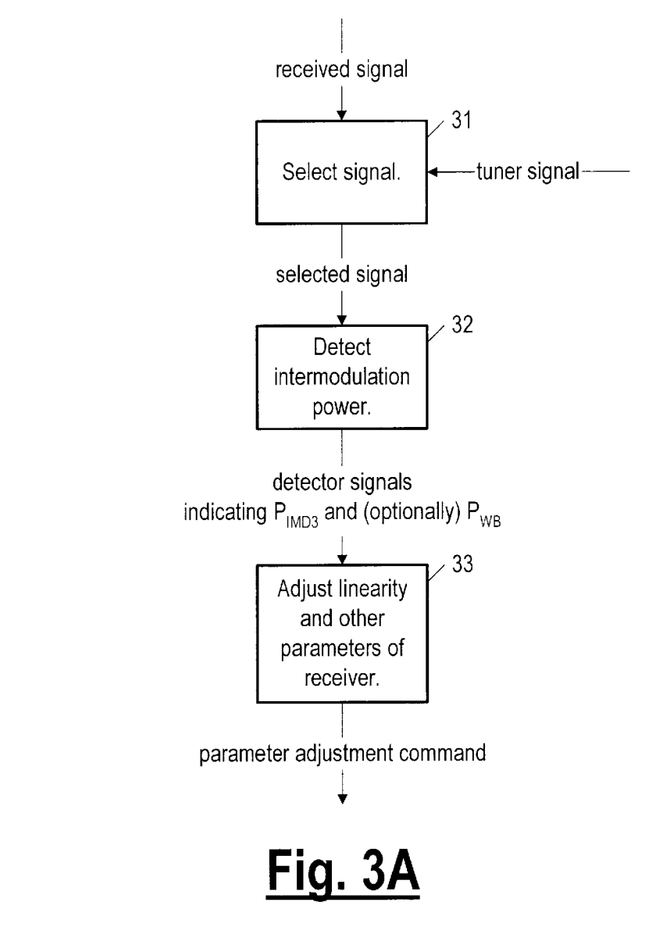
FIG. 3A is a flow diagram of the receiver control using the measured information from intermodulation.

Referring now to FIG. 3A, a flowchart for operation of an intermodulation detector according to the invention (so as to save power or optimize performance of a receiver module of a transceiver, or for use as a standalone intermodulation detector) is shown as including a first step 31, responsive to a received signal over a predetermined wide bandwidth and responsive to a tuner signal at a predetermined tuner frequency, of providing a selected signal; and a next step 32 of processing the selected signal so as to provide a detector signal indicating intermodulation distortion power $P_{IMD3}$ at the tuner frequency (and also, optionally, a detector signal indicating the total power $P_{WB}$). In case the detector is used in combination with a radio receiver module 10 (FIG. 1) for which the linearity and other receiver parameters are to be adjusted depending on the possible intermodulation distortion (as detected by the detector), the invention also includes a third step 33 of adjusting a linearity requirement and other parameters for the receiver module 10 based on the signal indicating the intermodulation distortion power $P_{IMD3}$; in such an application, the step of processing the mixed signal is performed using a detector circuit that is substantially more responsive to intermodulation interference than the receiver module.

Figure 3B:
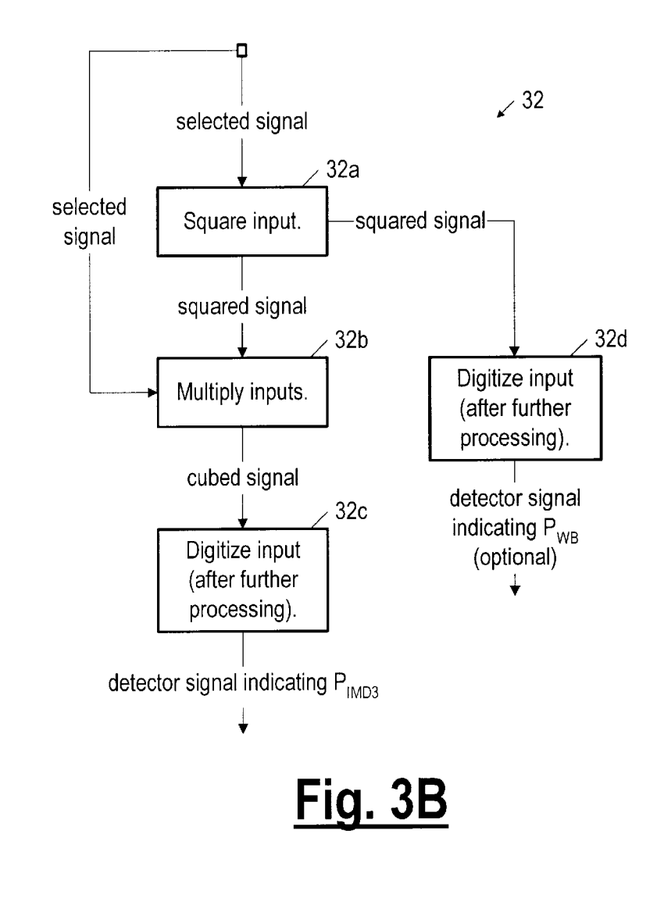
FIG. 3B is a flow diagram of one embodiment of using the method and apparatus for measuring intermodulation and total power according to the invention.

Referring to FIG. 3B, the step of measuring intermodulation distortion power PIMD3 is shown in more detail to include: a step 32a of squaring the selected signal; a step 32b of optionally providing the squared signal in a suitable digital form; a step 32c of multiplying the squared signal by the baseband signal to provide a cubed signal; and a step 32d of providing the cubed signal in a suitable digital form.

Figure 4:
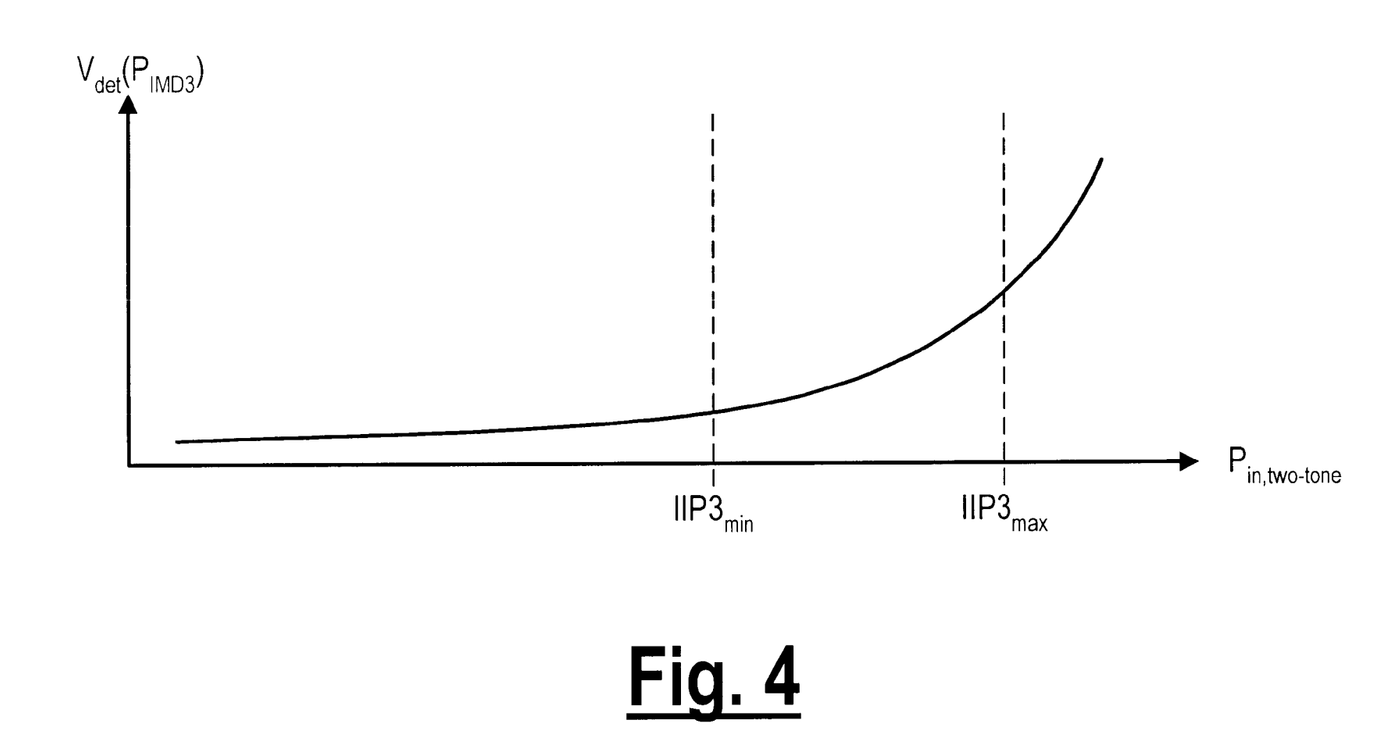
FIG. 4 is a graph of a detection curve of an intermodulation detector for use in providing dynamic tuning according to the invention, showing the detected voltage as a function of two-tone power input.

Referring now to FIG. 4, a detection curve of an intermodulator detector is shown in which the voltage signal provided by the detector corresponding to $P_{IMD3}$ is plotted as a function of a two-tone power input signal $P_{in,two-tone}$ according to a well-known standard measurement of the nonlinearity of a receiver (used in system specifications to define the linearity requirement of a system, for example). The shape of the detection curve for the intermodulation detector 11 depends on any possible frequency combination that causes intermodulation products to alias to the band of interest, not only on any predetermined combination given for example in a system specification. Thus, the constant (DC) value of the detected signal directly indicates the amount of unwanted distortion due to non-linearity, i.e. intermodulation. Linearity requirements for the radio receiver 10 (FIG. 1) can be calculated from the amount of distortion relative to the received signal with well-known methods. In FIG. 4, the range between $IIP3_{min}$ and $IIP3_{max}$ indicates one possible range of linearity performance described in terms of the third-order input intercept point (IIP3) that can be achieved with a proper integrated circuit and receiver system design for an adaptive receiver. Hence, it is possible to transfer the detected IIP3 product ($V_{det}$ ($P_{IMD3}$)) to an IIP3 specification, which is useful to be able to do because the IIP3 is a well-known and predictable parameter for the linearity in integrated circuit design. The relation between $P_{IMD3}$ and IIP3 can be expressed by the well-known formula:

$$IIP3 = 3/2 P_{in} - 1/2 P_{imd3,in},$$

where $P_{in}$ is the input power of the receiver (the source of intermodulation tones, $P_{in,two-tone}$), and $P_{IMD3,in}$ is the measured intermodulation power referred to the input, i.e. the measured tone from which the gain in the receiver provided before the node at which the intermodulation tone is measured has been subtracted.

The intermodulation detector is advantageously calibrated to remove process variations during fabrication. Calibration can be accomplished as follows. First, apply to the receiver 10 intermodulation test signals, according to a particular radio specification, such as a specification for WCDMA. The detected DC value (associated with the power aliasing into the frequency to which the receiver is being tuned) is then proportional to the maximum linearity requirement of the receiver. Then, either tune the DC value to a wanted value or store it as a reference value. In other words, internally calibrate the signal levels in the detector using adjustable gain to provide a known signal level at the input of the receiver, and then determine the corresponding signal level at the input of the detector or at the input of an ADC in the detector.

Usually, linearity is proportional to the consumed power, i.e. to improve linearity requires using more power. Hence, for purposes of conserving power, an upper limit on required linearity is needed. However, it is important to understand that only an upper limit for linearity, intended for a worst case situation, is defined in a typical radio specification. Often the operating environment is relaxed compared to the worst case allowed for in the specification. Hence, it is possible to scale down the current and so reduce linearity when the intermodulation detector of the invention indicates that the level of the interference is lower than what is set out in the specification, and no problems will be caused by reducing the current.

Instead of an upper or lower limit, it is also possible to indicate a reference level used to calibrate the intermodulation detector. The above-described upper limit can be used as the reference level, but any other known interference level can also be used.

The invention, an intermodulation detector 11 (FIG. 1), has been shown and described above as part of a receiver system 100 including a receiver module 10. An intermodulation detector according to the invention is not restricted to applications in which it operates as part of a radio receiver system; an intermodulation detector according to the invention can also operate as a standalone device. When an intermodulation detector according to the invention operates with a receiver module, it provides a measure of the maximum intermodulation power that could alias into the frequency to which the receiver is tuned (if the receiver is allowed to operate non-linearly). In the case of standalone, an intermodulation detector according to the invention tunes to one frequency after another and for each frequency, determines the maximum intermodulation power that could alias (from some predetermined wide bandwidth) into the frequency to which the detector is tuned, and so characterizes the radio environment over the predetermined wide bandwidth.

For standalone use, the intermodulation detector 11 in FIG. 2A can be removed from the radio module 10 if the parts that are common to the radio receiver 10 and to the intermodulation detector 11 are added to the intermodulation detector 11 (used with the radio receiver 10) to form a standalone intermodulation detector (not shown as such); such parts are the local oscillator (LO) 70, the low noise amplifier (LNA) 75, and band pass filter (BPF). Adding these blocks to the blocks of the intermodulation detector 11 provides a standalone intermodulation detector that does not need any signal or supply from a radio receiver and is able to work independently.

A standalone intermodulation detector that is used to receive signals wirelessly is further equipped with an antenna in front of the first BPF. A standalone intermodulation detector that is used to monitor interferences, for instance in a cable network, is preferably equipped with an impedance matching circuit to match input of the BPF to the cable network, instead of with an antenna. As is known to those skilled in the art, an intermodulation detector also needs a power supply and a controller to control for instance the local oscillator 70.

SCOPE OF THE INVENTION

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method, comprising:
   a) a step (31), responsive to a received signal over a predetermined wide bandwidth including a desired signal on a predetermined channel, for providing a selected signal including the predetermined channel; and
   b) a step (32) of processing the selected signal so as to provide a detector signal indicating intermodulation distortion (IMD3) on the predetermined channel, the processing including filtering the selected signal as necessary so as to produce a processed signal not including the desired signal but including possible third order intermodulation products of signals associated with other channels and included in the received signal, and further including at least one third-order nonlinear operation on the processed signal.

2. A method as in claim 1, further comprising a step (33) of adjusting a linearity requirement for a receiver module based on the detector signal indicating intermodulation distortion power (PIMD3), wherein the step of processing the selected signal is performed using a detector circuit that is substantially more responsive to intermodulation interference than the receiver module.

3. A method as in claim 1, wherein the step of measuring intermodulation distortion power (PTMD3) comprises:

i) a step (32*a*) of squaring the selected signal;
   ii) an optional step (32*b*) of providing the squared signal in a suitable digital form;
   iii) a step (32*c*) of multiplying the squared signal by the baseband signal to provide a cubed signal; and
   iv) a step (32*d*) of providing the cubed signal in a suitable digital form.

4. A method as in claim 1, wherein the third-order nonlinear operation on the processed signal includes at least two self-mixing operations performed in series on the processed signal.

5. An apparatus (11), comprising:
   a) means (700 701 70 76 77), responsive to a received signal over a predetermined wide bandwidth including a desired signal on a predetermined channel, for providing a selected signal including the predetermined channel; and
   b) means (71 710 72 720 704*a*) for processing the selected signal so as to provide a detector signal indicating intermodulation distortion (IMD3) on the predetermined channel, the processing including filtering the selected signal as necessary so as to produce a processed signal not including the desired signal but including possible third order intermodulation products of signals associated with other channels and included in the received signal, and further including at least one third-order nonlinear operation on the processed signal.

6. An apparatus (11) as in claim 5, further comprising means (12) for adjusting a linearity requirement for a receiver module (10) based on the detector signal indicating intermodulation distortion power (PIMD3), wherein the means for processing the selected signal is performed using a detector circuit that is substantially more responsive to intermodulation interference than the receiver module (10).

7. A radio transceiver, including a radio receiver (100), wherein the radio receiver (100) includes an apparatus (11) as claimed in claim 6.

8. An apparatus (11) as in claim 5, wherein the means (71 710 72 720 704*a*) for processing the selected signal comprises:
   a) means (710 71) for squaring a signal derived from the selected signal, and so providing a squared signal;
   b) means (720 72) for multiplying the squared signal with the selected signal, and so providing a cubed signal; and
   c) means (704*a*) for processing the cubed signal so as to provide the detector signal indicating intermodulation distortion power (PIMD3).

9. A radio transceiver, including a radio receiver (100), wherein the radio receiver (100) includes an apparatus (11) as claimed in claim 8.

10. An apparatus as in claim 5, wherein the means (700 701 70 76 77) for providing a selected signal comprises means (700) for providing a baseband signal, and further wherein all operations including those performed by the means (700) for providing a baseband signal are performed after analog-to-digital conversion.

11. A radio transceiver, including a radio receiver (100), wherein the radio receiver (100) includes an apparatus (11) as claimed in claim 10.

12. An apparatus as in claim 5, further comprising an analog-to-digital conversion means (704*a* 84) for performing an analog-to-digital conversion and disposed at some node of the apparatus so that at least some of the signal processing performed by the apparatus is digital signal processing performed after the analog-to-digital conversion means (704*a* 84).

13. A radio transceiver, including a radio receiver (100), wherein the radio receiver (100) includes an apparatus (11) as claimed in claim 12.

14. A radio transceiver, including a radio receiver (100), wherein the radio receiver (100) includes an apparatus (11) as claimed in claim 5.

15. An apparatus (11) as in claim 5, wherein third-order nonlinear operation on the processed signal includes at least two self-mixing operations performed in series on the processed signal.

* * * * *

UNITED STATES PATENT AND TRADEMARK OFFICE
CERTIFICATE OF CORRECTION

PATENT NO. : 6,646,449 B2
DATED : November 11, 2003
INVENTOR(S) : Pauli Seppinen, Aarno Pärssinen and Mikael Gustafsson

It is certified that error appears in the above-identified patent and that said Letters Patent is hereby corrected as shown below:

Column 4,
Line 43, reads "Intermodula-tion detector" should read -- Intermodulation dector --.

Column 9,
Line 67, reads "power (PTMD3) comprises:" should read -- power (PIMD3) comprises: --.

Signed and Sealed this

Eighteenth Day of May, 2004

JON W. DUDAS
*Acting Director of the United States Patent and Trademark Office*